Figure 1:
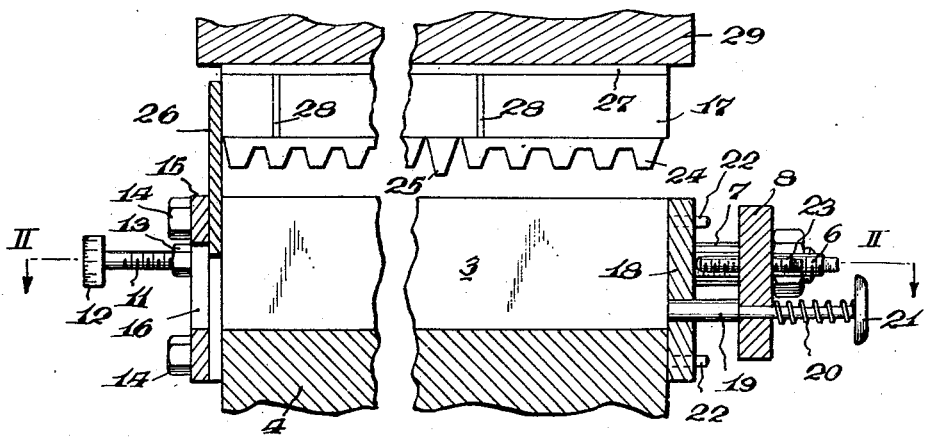

Feb. 29, 1944.　　　　A. SUCHANN　　　　2,342,769
DEVICE FOR MANUFACTURING PRESSED ARTICLES
Filed Feb. 8, 1940

Inventor
A. Suchann,

Patented Feb. 29, 1944

2,342,769

UNITED STATES PATENT OFFICE 2,342,769

DEVICE FOR MANUFACTURING PRESSED ARTICLES

Alfred Suchann, Vienna, Germany; vested in the Alien Property Custodian

Application February 8, 1940, Serial No. 317,950 In Germany February 14, 1939

2 Claims. (Cl. 18—34)

The invention relates to a device for manufacturing pressed articles made of artificial resin and like materials and especially articles with side faces parallel to the direction of the stroke of the press. This device is especially suitable for manufacturing printing material, margin sticks, etc. Formerly it was necessary to construct press moulds for artificial resin articles and the like with slightly conical side walls avoiding sharp edges, as otherwise it was very difficult to disconnect the articles from the mould. For certain purposes, especially for printing material and the like, however, only articles of very accurate dimensions with absolutely parallel walls and sharp edges can be used. According to the invention the distance between the side walls of the press mould can be adjusted in accordance with the required dimension of the article, and after pressing has been finished this distance can be increased so that in spite of the parallel walls and the sharp edges the pressing easily can be taken out. The adjustment of the mould walls can be effected in such a manner that the shrinkage of the pressing is taken into account.

Therefore the process according to the invention on one hand renders it possible to manufacture articles especially with side walls parallel to the direction of the stroke of the press and sharp edges with greatest accuracy of the dimensions, and on the other hand preserves the article from damages because in view of the fact that the distance between the side walls of the mould is increased after article had been finished, the removal of the article can be effected easily and without employing force.

By the process according to the invention printing material—especially margin sticks, etc.—can be made of masses which can be pressed. The articles just mentioned must be provided with parallel, non-conical side walls and the prescribed exact dimensions must be guaranteed. With printing material the exactness of the dimensions must correspond to $1/1000$ of a millimeter. Up to now only printing material made of lead, type metal, etc., could be used and iron for the base sticks, etc.

In view of the exact adjustment of the press mould in accordance with the invention, taking into account also the shrinkage, articles can be made with such an accuracy that the same can be used directly and without finishing operations even for printing material. According to the invention the accuracy of the dimensions of the articles within the limits prescribed by the special purpose for which the articles shall be used is guaranteed by the fine adjustment of the distance between the walls of the press mould. Therefore, artificial resin and the like substances can be used for pressed articles which up to now, in view of the difficulty or impossibility to press such articles with parallel side walls and greatest accuracy, could not be used. Therefore valuable substances can be saved and greater economy can be achieved. For instance with printing by the possibility to make use of artificial resin and the like, great economy can be achieved by saving the comparatively expensive lead. Furthermore the weight of the composition is reduced to such an extent that the printing press can work with a velocity 30% higher than the velocity possible up to now. The life of the substance used according to the invention practically is not limited at all, whereas printing material made of lead and the like can be damaged easily so that it becomes useless.

According to the invention the adjustment of the press mould walls and the increase of the distance between the same after pressing has been finished is effected by the same means, whereby the adjustment or fine adjustment is facilitated by adjustable stops. Therefore the adjustment and opening of the press mould as well as an alteration of the width of the mould can be effected by simplest manipulation. Advantageously however only the adjustment of the dimension of the mould normal to the direction of the stroke of the press is effected by a corresponding adjustment of the walls of the mould, whereas the adjustment of the height of the pressing is effected by an adjustment of the plunger or the punch.

Manufacturing of bar shaped pressings can be made in such a manner that only the width and the height or eventually only the width of the bar is adjusted in accordance with the invention, whereas the exact length of the bar is made by subsequent finishing operations of the ends of the bar. For instance therefore bars as used for sticks in printing can be pressed in greater length provided with grooves or the like, so that the bar can be easily broken into corresponding lengths and finished afterwards.

The process according to the invention can be simplified materially by making use of preformed (briquetted) pieces made separately instead of filling the press mould with powder.

The device for carrying out the process according to the invention in essence is characterized by a press mould, at least one of the walls of the mould being arranged in an adjustable manner in such a way that the mould can be adjusted to correspond exactly to certain dimensions, and that the mould can be opened. According to the invention the adjustment of the wall or walls of the mould is effected by a movable wedge or the like, whereby in order to facilitate the exact adjustment of the distance of the mould walls the movement of the wedge or the like can be limited by adjustable stops, Advantageously the arrangement is made in such a manner that the wedge supports the movable wall over the whole length of the same.

In order to facilitate the removal of the article the device can be constructed in such a manner that one wall of the mould or a part of the same is connected with the plunger, so that in the opened position the article can be thrown out by a discharging part provided on the opposite wall. The preformed (briquetted) piece can be inserted through the same opening.

According to the invention articles of comparatively great length can be manufactured with greatest accuracy and absolute uniformity.

Figure 2:
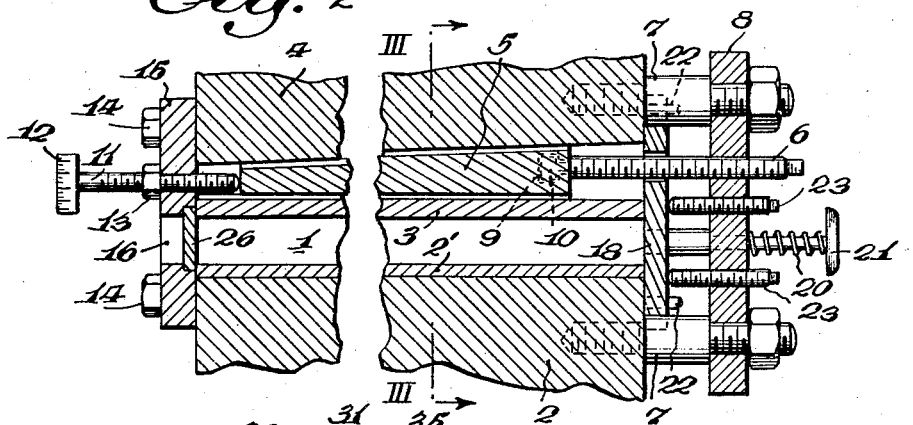
Figure 3:
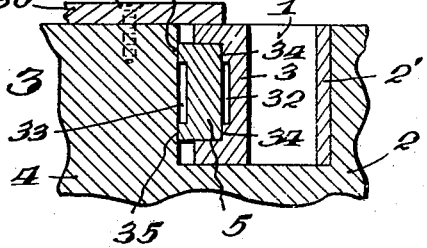

In the drawing a constructional form of the device according to the invention is shown in a schematic manner. Fig. 1 shows the press mould in vertical elevation partly in section. Fig. 2 shows a horizontal section along II—II of Fig. 1, and Fig. 3 shows a vertical section along III—III of Fig. 2.

1 is the hollow space of a mould adapted for bar-shaped pressings, 2 is the fixed wall which advantageously is provided with an exchangeable plate 2', and 3 is the movable wall. Between the body 4 of the mould and the movable wall 3 a wedge 5 with slight pitch is arranged. By moving the wedge 5 in its longitudinal direction, the wall 3 can be adjusted so that the width of the mould can be made greater or smaller whereby, as shown in Fig. 3, the wedge serves as a guide for the wall 3. The adjustment of the wedge 5 is effected by a screw spindle 6 cooperating with the screw nut provided in the bridge piece 8 connected to the body of the mould by stay bolts 7. Instead of the screw spindle, of course also a lever mechanism can be used, eventually with fine and coarse adjustment. The end of the screw spindle 6 is provided with a collar 10 cooperating with a groove 9 in the broader end of the wedge 5. By pushing the wedge 5 to the right hand side the distance between the walls 2 and 3 becomes greater so that the finished article easily can be removed from the mould. By pushing the wedge 5 to the left hand side the distance between the walls 2 and 3 becomes smaller. The pitch of the wedge 5 is so slight that the press power is taken up by the wedge so that no power is exerted on the screw spindle.

A cover plate 30 is connected to the body 4 of the mould, the cover plate serving as a guide for the movable wall 3. In view of the arrangement of the cover plate the movable wall 3 cannot move upwardly. The friction of the wedge during its movement is diminished by providing a groove 32 in the rear side of the wall 3, and the wedge 5 itself is provided with a groove 33 so that the parts are supported only by the strips 34 and 35.

The adjustment of the mould in accordance with the prescribed exact dimension is effected by the adjusting screw or stop 11 limiting the movement of the wedge to the left. The screw head 12 is provided with a scale so that the adjustment can be made easily. The adjusting screw 11 can be provided with a locking nut 13. Closing of the mould is effected by turning the spindle 6 until the wedge comes to the stop 11. Therefore the exact adjustment of the mould is maintained notwithstanding the fact that the mould is opened after each pressing operation.

The adjusting screw 11 is guided in a cover plate 15 connected to the body of the mould by screws 14.

In order to enable a lateral removal of the finished article the cover plate 15 is provided with an opening 16 closed by a slide 26 guided in the cover plate 15. This slide 26 constituting at the same time a wall of the mould is connected with a plunger 17 in such a manner that the mould is closed automatically by the slide 26 during the beginning of the pressing stroke of the plunger and opened again at the end of the return stroke of the plunger. The opposite cover plate 18 of the mould is provided with a hole serving as a guide for the discharging bar 19. Furthermore, the discharging bar 19 is guided in the bridge piece 8 and is kept in its withdrawn position by a spring 20. By pushing the knob 21 of the bar, the finished article easily can be removed from the mould through the opposite opening.

The cover plate 18 is guided by pins 22 provided in the body of the mould and is pressed against the body of the mould by screw spindles 23. It will be understood that therefore by loosening or removing the cover plate, cleaning of the mould can be effected easily.

The form of the device illustrated in the drawing serves for manufacturing articles which can be used as blind sticks in printing. Therefore the plunger is provided with projections 24 forming corresponding grooves in the stick so that material is saved and the stick gets the common form of lead sticks. To simplify the device, several sticks are pressed in one single piece and the article is divided afterwards correspondingly. For this purpose the plunger is provided with greater projections 25 distributed in accordance with the required length of the sticks, the projections 25 weakening the article in such a manner that it can be broken easily. The place of breaking can be subjected afterwards to a finishing operation.

The exact adjustment of the height of the article is effected by a corresponding adjustment of the plunger or the punch. For this purpose plates 27 or the like of different thickness can be inserted between the punch and the head 29.

In order to facilitate the elimination of superfluous material and air between the punch and the mould walls, grooves 28 can be provided in the punch.

What I claim is:

1. A mould for correcting the inaccuracy in size of the work piece, comprising opposite side walls one of which is slidable laterally, means for exactly adjusting said walls, means for increasing the distance between the opposite walls after pressing, and a plunger-like member, another mould wall being slidably mounted and connected to the said plunger-like member whereby this last mentioned wall is withdrawn automatically during the return stroke of the said plunger-like member.

2. A mould for correcting the inaccuracy in size of the work piece, comprising side walls one of which is slidable laterally, means for exactly adjusting said walls, means for increasing the distance between the opposite walls after pressing, and a plunger-like member, a slidable end wall connected to the said plunger-like member, another end wall opposite to the said slidable end wall, and a discharging bar arranged in the said last named end wall.

ALFRED SUCHANN.